(12) United States Patent
Nakashima

(10) Patent No.: US 9,856,010 B2
(45) Date of Patent: Jan. 2, 2018

(54) AIRCRAFT WINDSHIELD AND METHOD FOR SUSPENDING AIRCRAFT WINDSHIELD

(71) Applicant: MITSUBISHI AIRCRAFT CORPORATION, Aichi (JP)

(72) Inventor: Keiji Nakashima, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 316 days.

(21) Appl. No.: 14/629,974

(22) Filed: Feb. 24, 2015

(65) Prior Publication Data

US 2016/0052616 A1 Feb. 25, 2016

(30) Foreign Application Priority Data

Aug. 21, 2014 (JP) .................. 2014-168196

(51) Int. Cl.
*B64C 1/14* (2006.01)

(52) U.S. Cl.
CPC .................. *B64C 1/1492* (2013.01)

(58) Field of Classification Search
CPC ... B64C 1/1492; B64C 1/1476; B64C 1/1484; B60J 1/006; B60J 1/004; B60J 1/007; E04B 1/3511; E04B 1/4128; F16B 37/122; F16B 37/044
USPC ........ 29/897.1, 897–897.35, 402.01–402.21, 29/464, 525.01–525.15, 559
See application file for complete search history.

(56) References Cited

U.S. PATENT DOCUMENTS

| | | | | |
|---|---|---|---|---|
| 2,144,553 | A * | 1/1939 | Simmonds | F16B 37/044 411/111 |
| 2,421,278 | A * | 5/1947 | Luce | F16B 37/045 411/84 |
| 4,933,227 | A | 6/1990 | Stewart | |
| 4,964,594 | A * | 10/1990 | Webb | B64C 1/12 244/129.3 |
| 5,758,785 | A * | 6/1998 | Spinosa | B66C 23/48 212/232 |
| 9,221,533 | B1 * | 12/2015 | Grady | B64C 1/1492 |

(Continued)

FOREIGN PATENT DOCUMENTS

JP 2-204197 A 8/1990

OTHER PUBLICATIONS

JP2016043751A (application JP2014168196)—english machine translation.*

*Primary Examiner* — Tien Q Dinh
*Assistant Examiner* — Alexander V. Giczy
(74) *Attorney, Agent, or Firm* — Pearne & Gordon LLP

(57) ABSTRACT

A row formed by a plurality of windshield fasteners, which fasten an outboard retainer, a panel, and an inboard retainer of a windshield of an aircraft, along a peripheral edge part of the windshield panel includes a first fastener, which is disposed at a predetermined position, and a pair of second fasteners, which is disposed in alignment with the row, one on each side of the first fastener. A plate, which is fastened along with the windshield panel by the first fastener and the pair of second fasteners, is disposed on the inboard retainer on the inside of the aircraft. The first fastener can be attached to or detached from a fixing nut, which is fixed on the plate, from the outside of the aircraft, and can be replaced with a suspension fastener on which a wire to be mounted on the windshield can be fitted.

6 Claims, 7 Drawing Sheets

(56) References Cited

U.S. PATENT DOCUMENTS

| | | | | |
|---|---|---|---|---|
| 2003/0010867 A1* | 1/2003 | Wojatschek | .......... | B64C 1/1492 244/129.2 |
| 2007/0102580 A1* | 5/2007 | Wood | .................... | B64C 1/1492 244/129.3 |
| 2008/0099601 A1* | 5/2008 | Christman | .............. | B64C 25/16 244/102 A |
| 2009/0084900 A1* | 4/2009 | Krahn | ................... | B64C 1/1492 244/129.3 |
| 2009/0245968 A1* | 10/2009 | Cavailles | ............. | F16B 33/002 411/181 |

* cited by examiner

AIRCRAFT WINDSHIELD AND METHOD FOR SUSPENDING AIRCRAFT WINDSHIELD

BACKGROUND OF THE INVENTION

Field of the Invention

The present invention relates to a structure of a windshield for suspending a windshield during maintenance of an aircraft and a method for providing a windshield with a lifting component.

Description of the Related Art

An aircraft windshield is assembled by holding a windshield panel between two retainers, inserting a fastener into a sleeve disposed in the thickness direction of these windshield panel and retainers, and fixing the fastener with a nut as shown in Japanese Patent Laid-Open No. H2-204197, for example. This type of windshield is installed in an airframe by fixing the retainer, which is disposed on the outside of the aircraft, on the airframe with a fastener.

When the windshield is removed from the airframe for maintenance of the windshield, to prevent fall of the windshield, the windshield is suspended through wires mounted at a plurality of positions in the peripheral edge part of the windshield. To securely fix these wires on the windshield, suspension fasteners having a head part on which the wire can be fitted are fixed on the peripheral edge part of the windshield. Bushes for fixing the suspension fasteners are provided in the peripheral edge part of the windshield. These bushes are normally covered with other fasteners having a conical head part, and for maintenance of the windshield, these fasteners are removed and the suspension fasteners are fixed on the bushes.

The bush for fixing the suspension fastener on the windshield is embedded and bonded in the peripheral edge part of the windshield. The present inventors wish to provide a windshield which has a structure for suspending a windshield in a simpler manner without providing the windshield with such a bush.

If the fastener fastened on such a bush is damaged, maintenance is disrupted as the fastener and the bush cannot be easily removed from the windshield.

The present invention aims to provide a simpler structure for suspending an aircraft windshield as well as to improve the maintainability of a windshield.

SUMMARY OF THE INVENTION

An aircraft windshield of the present invention is a windshield provided in an airframe of an aircraft, the windshield including: a panel forming the windshield; an outboard retainer disposed on the panel on the outside of the aircraft; an inboard retainer disposed on the panel on the inside of the aircraft; a plurality of windshield fasteners which fasten the outboard retainer, the panel, and the inboard retainer; and a plurality of airframe fixing fasteners which fasten the outboard retainer and the airframe.

A row formed by the plurality of windshield fasteners along the peripheral edge part of the panel includes a first fastener disposed at a predetermined position and a pair of second fasteners disposed in alignment with the row, one on each side of the first fastener.

A plate which is fastened along with the panel by the first fastener and the second fasteners is disposed on the inboard retainer on the inside of the aircraft.

The first fastener can be attached to or detached from a fixing nut, which is fixed on the plate, from the outside of the aircraft.

A plurality of fastener groups each composed of the first fastener and the pair of second fasteners are disposed at intervals in the circumferential direction of the panel.

The first fastener in each of the plurality of fastener groups can be replaced with a suspension fastener on which a lifting component to be mounted on the windshield can be fitted.

According to the present invention thus configured, the suspension fastener, on which the lifting component can be fitted, can be fixed on the windshield by disposing the plate with the fixing nut fixed on it on the inboard retainer on the inside of the aircraft, fastening the plate along with the windshield by the first fastener, which can be replaced with the suspension fastener, and the pair of second fasteners, and fixing the suspension fastener in place of the first fastener to the fixing nut. The present invention can provide a simpler structure for suspending a windshield, since it does not require providing the windshield with embedded bushes.

Even if the first fastener, the fixing nut, or the suspension fastener is damaged, the plate and the damaged fastener and the fixing nut can be easily removed from the windshield by removing the pair of second fasteners which fastens the windshield and the plate, so that the maintainability of the windshield can be improved.

In the aircraft windshield of the present invention, it is preferable that the windshield fastener be disposed with its head part directed to the outside of the aircraft; a recess, into which a tool can be inserted, be formed in the head part of the first fastener; and the recess be not formed in the head part of the second fastener.

Then, in the row formed by the windshield fasteners, the first fasteners can be sorted out on the basis of the recess being formed in it, while avoiding mistakenly removing the second fasteners in which no recess is formed.

An aircraft of the present invention includes the above-described windshield.

A method for suspending an aircraft windshield of the present invention includes: a first step of loosening the first fastener from the fixing nut from the outside of the aircraft to remove the first fastener from the windshield; a second step of inserting the suspension fastener into a through-hole of the windshield, into which the first fastener has been inserted, from the outside of the aircraft and fastening the suspension fastener to the fixing nut; a third step of removing the airframe fixing fastener from the outside of the aircraft; and a fourth step of suspending the windshield through the lifting component.

According to the present invention, it is possible to provide a simpler structure for suspending an aircraft windshield as well as to improve the maintainability of a windshield.

DETAILED DESCRIPTION OF THE PREFERRED EMBODIMENT

In the following, an aircraft windshield according to an embodiment of the present invention will be described with reference to the accompanying drawings.

Figure 1A:
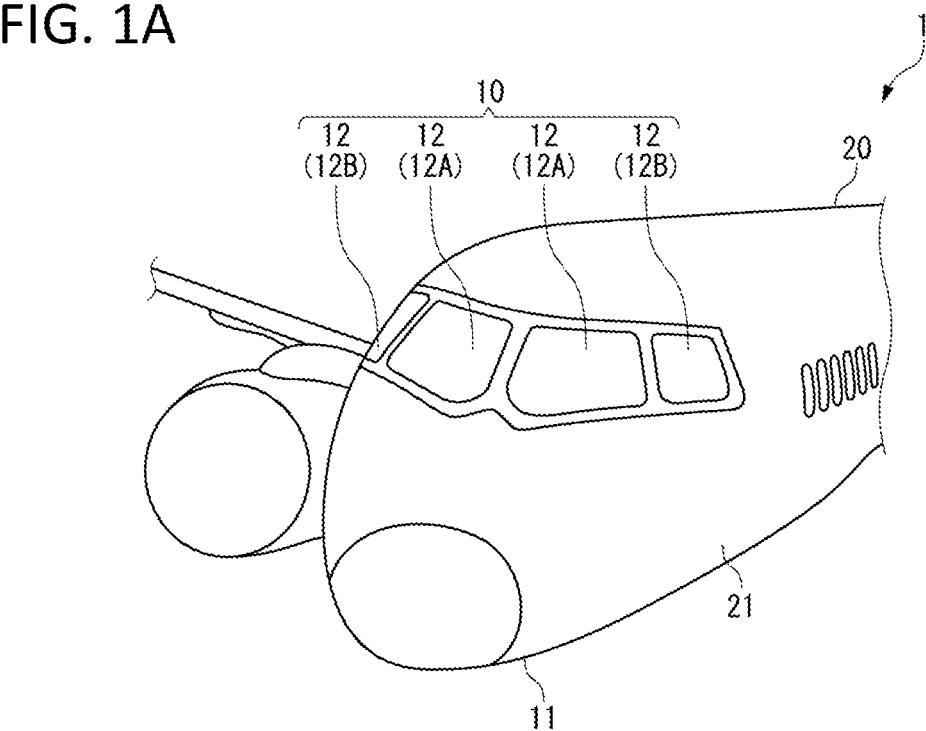
FIG. 1A is a view showing four windshields provided in an aircraft according to an embodiment of the present invention.
Figure 1B:
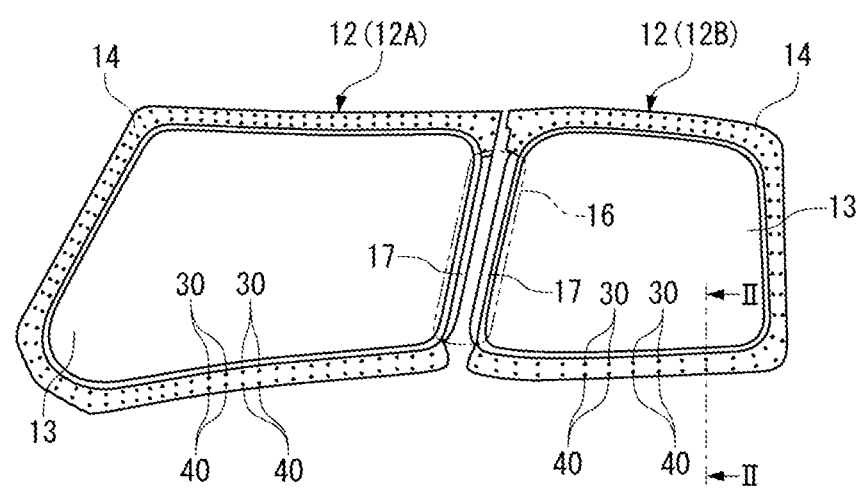
FIG. 1B is a view from the outside of the aircraft showing a first windshield and a second windshield provided on the left side of the airframe of the aircraft according to the embodiment of the present invention.

As shown in FIGS. 1A and 1B, a nose 11 of an aircraft 1 is provided with a windshield device 10. The windshield device 10 is composed of first windshields 12A, 12A located on the front side in the traveling direction of the aircraft 1 and second windshields 12B, 12B located on the left and right sides of these first windshields 12A, 12A. These windshields 12B, 12A, 12A, 12B are disposed in a left-right symmetry to the axis of the fuselage of the aircraft 1.

Figure 2:
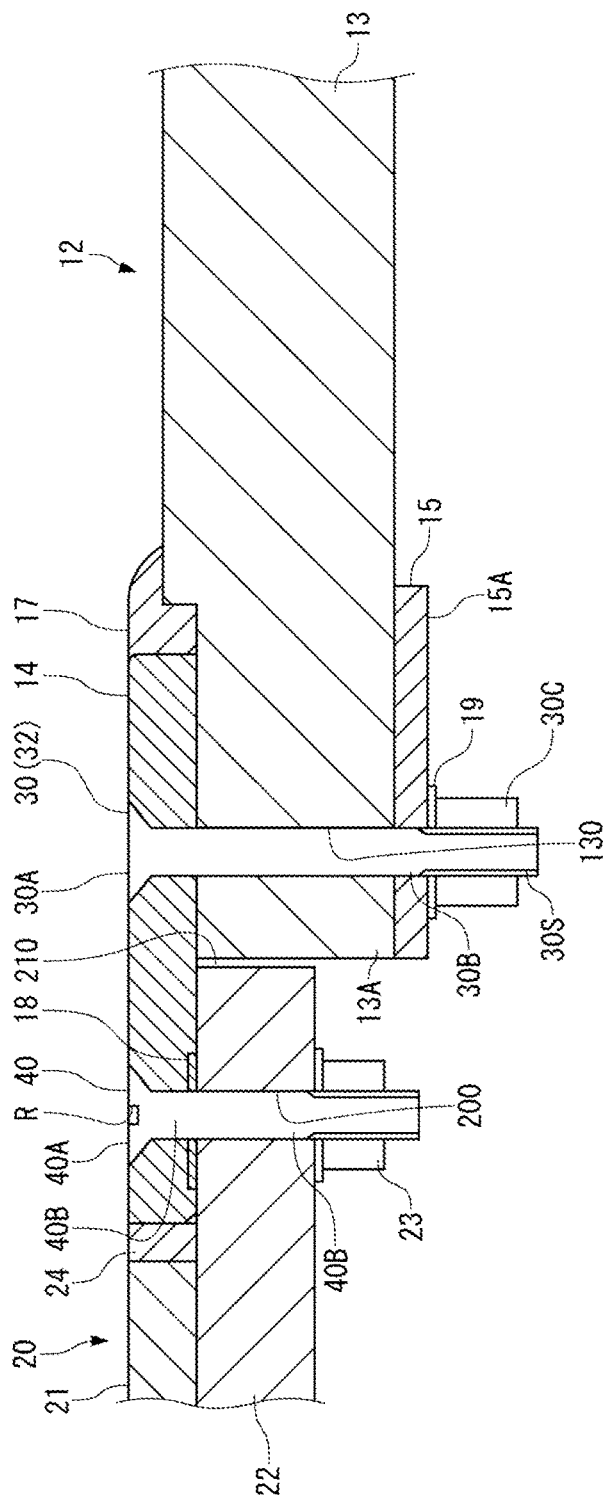
FIG. 2 is a view along the line II-II of FIG. 1B showing a windshield fastener and an airframe fixing fastener.

These four windshields 12B, 12A, 12A, 12B cover one opening 210 (FIG. 2) formed in a frame 22 of an airframe 20. The frame 22 supports a skin 21 from the back side (FIG. 2). A nose part of the airframe 20 includes, as structural members, the frame 22, the skin 21, and stringers (not shown). These members can be formed from a metal material such as an aluminum alloy or a fiber-reinforced resin containing reinforcing fibers such as glass fibers or carbon fibers.

In the following, when the windshields 12B, 12A, 12A, 12B are not differentiated from one another, each of them is simply called a windshield 12.

The number of windshields 12 is not limited to four but may be an arbitrary number.

The windshield 12 has the strength to sufficiently withstand various loads applied to it during a flight, such as a load due to the pressure difference between the pressure inside the aircraft and the pressure outside the aircraft, an aerodynamic load due to air resistance during a flight, or an impact load due to collision with a bird etc.

As shown in FIG. 1B and FIG. 2, the windshield 12 includes, as major components, a transparent windshield panel 13, an outboard retainer 14 which is disposed on a surface of a peripheral edge part 13A of the windshield panel 13 on the outside of the aircraft; and an inboard retainer 15 which is disposed on a surface of the peripheral edge part 13A on the inside of the aircraft.

While not shown in detail, the windshield panel 13 is configured with an impact buffer layer and an anti-icing conductive layer held between an outer panel disposed on the outside of the aircraft and an inner panel disposed on the inside of the aircraft. In this embodiment, the outer panel and the inner panel are formed from a glass material, but these panels can also be formed from an acrylic resin.

The configuration of the windshield panel 13 is not limited to this embodiment but can be appropriately changed.

As shown in FIG. 1B, the outboard retainer 14 is formed so as to be disposed in each of the first windshield 12A and the second windshield 12B along all the sides except for the side located on the border between the first windshield 12A and the second windshield 12B. On the border between the first windshield 12A and the second windshield 12B, a border retainer 16 (indicated by the two-dot chain line in FIG. 1B) having a linear shape is disposed along the side of each of the first windshield 12A and the second windshield 12B. The border retainer 16 corresponds to the outboard retainer shared by adjacent windshields 12.

In view of weight reduction, an aluminum alloy can be preferably used as the material of the outboard retainer 14, the border retainer 16, and the inboard retainer 15.

As shown in FIG. 2, the outboard retainer 14 extends from the peripheral edge part 13A of the windshield panel 13 toward the outside. The inside in the width direction of the outboard retainer 14 is fixed on the peripheral edge part 13A of the windshield panel 13, while the outside in the width direction of the outboard retainer 14 is fixed on the airframe 20.

The clearance between the inner peripheral edge of the outboard retainer 14 and the outer peripheral edge of the surface layer of the windshield panel 13 is continuously sealed by a seal 17. The clearance between the back surface of the outboard retainer 14 and the front surface of the frame 22 is sealed by a seal 18. The clearance between the outer peripheral edge of the outboard retainer 14 and the end surface of the skin 21 is sealed by a seal 24. The pressure inside the aircraft is maintained by these seals 17, 18, 24. Both the seals 17, 24 of this embodiment are formed by packing the part to be sealed with a sealant material having fluidity and curing the sealant material.

The inboard retainer 15 is disposed along the surface of the peripheral edge part 13A of the windshield panel 13 on the inside of the aircraft. The inboard retainer 15 is formed annularly along the peripheral edge part 13A of the windshield panel 13.

The windshield 12 is assembled by holding the windshield panel 13 between the outboard retainer 14 and the inboard retainer 15 from the outside and the inside of the aircraft and fixing them with windshield fasteners 30.

The windshield fastener 30 is a fastening bolt integrally having a head part 30A and a shank part 30B, and constitutes fastening means along with a nut 30C disposed on the inside of the aircraft. The head part 30A, which constitutes an aerodynamic surface, has a conical shape and is housed in a bowl-shaped countersunk formed in the outboard retainer 14. A screw 30S is formed on the leading end side of the shank part 30B.

The windshield fastener 30 and the nut 30C can be formed from stainless steel, a titanium alloy, etc. A washer 19 is inserted between the surface of the inboard retainer 15 on the inside of the aircraft and the nut 30C.

The windshield fastener 30 penetrates the windshield 12 in the thickness direction in the order of the outboard retainer 14, the windshield panel 13, and the inboard retainer 15 from the outside of the aircraft. A seal (not shown) may be provided between the outboard retainer 14 and the windshield panel 13 and between the windshield panel 13 and the inboard retainer 15.

A through-hole 130, into which the windshield fastener 30 is inserted, is formed in these outboard retainer 14, windshield panel 13, and inboard retainer 15. The windshield fastener 30 is inserted into a sleeve (not shown) disposed inside the through-hole 130. The windshield fastener 30 is fixed by being fastened to the nut 30C. The windshield fastener 30 is fastened with a tool from the inside of the aircraft.

Since the windshield 12 once assembled is not supposed to be disassembled, the outboard retainer 14, the windshield panel 13, and the inboard retainer 15, which are the components of the windshield 12, can be connected permanently with one another. While it is acceptable to use a rivet instead of the fastening bolt for assembling the windshield 12, in this embodiment, the fastening bolt is adopted, for which a material having a high specific strength such as stainless steel or a titanium alloy can be used and which has high reliability. As the fastening bolt, one intended for applications based on permanent connection is preferably used.

On the other hand, in order to remove the windshield 12 from the airframe 20 during maintenance, the windshield 12, the airframe 20, and the outboard retainer 14 interposed therebetween are not connected permanently with one another but assembled through detachable airframe fixing fasteners 40.

Similarly to the windshield fastener 30, the airframe fixing fastener 40 is a fastening bolt integrally having a head part 40A and a shank part 40B, and the head part 40A has a conical shape.

The airframe fixing fastener 40 is located further on the outside in the width direction in the outboard retainer 14 than the position of the windshield fastener 30. A plate nut 23, on which this airframe fixing fastener 40 is fastened, is provided in the frame 22. A recess R, into which a tool can be inserted, is formed in the head part 40A so that the airframe fixing fastener 40 can be fastened from the outside of the aircraft.

The frame 22 is disposed so as to surround the opening 210 of the skin 21.

As shown in FIG. 1B, a large number of windshield fasteners 30 are disposed at intervals in the circumferential direction on the inner peripheral side of the outboard retainer 14. A large number of airframe fixing fasteners 40 are disposed at intervals in the circumferential direction on the outer peripheral side of the outboard retainer 14.

As will be described later, a row formed by the plurality of windshield fasteners 30 includes a first fastener 31, which is disposed at a predetermined position, and a pair of second fasteners 32, 32, which is disposed one on each side of the first fastener 31 in alignment with the row formed by the windshield fasteners 30.

Both the above-described fasteners 30, 40 are required to have a sufficient strength against a load applied to the windshield 12 during a flight. The material, the diameter, and the fastening torque of the fasteners 30, 40 are properly determined in order to secure the strength. The number and the arrangement of the fasteners 30, 40 are also properly determined.

The above-described outboard retainer 14, inboard retainer 15, and border retainer 16 are covered by interior members provided in a cockpit and not exposed to the inside of the aircraft. The interior members include a liner covering the structural members such as the frame 22 and the skin 21, a panel on which instruments are disposed, and various other members for improving the visual appearance or buffering impact.

The configuration for suspending the windshield 12 during maintenance will be described as the feature of this embodiment.

Figure 3A:
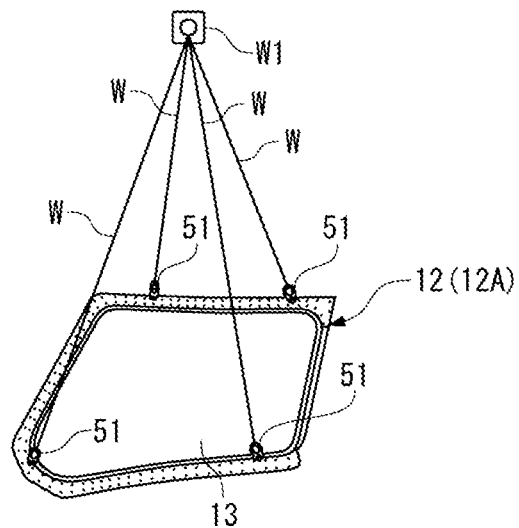
FIG. 3A is a view showing how the windshield is suspended through wires.

In order to prevent fall of the windshield 12 which has been removed from the airframe 20, before removing the windshield 12 from the airframe 20, one ends of wires W are each mounted at several positions (four positions in this example) in the peripheral edge part of the windshield 12, and a metal fitting W1 which bundles the other ends of the wires W is set on an arm of a crane (not shown) as shown in FIG. 3A. Thus, as the windshield 12 is suspended by the crane without falling even when the windshield 12 is separated from the airframe 20, the airframe fixing fastener 40 is removed using a tool etc. from the outside of the aircraft. Then, maintenance or replacement with a new one of the windshield 12 is performed.

In this embodiment, the wire W is mounted at four positions of the windshield 12.

Figure 3B:
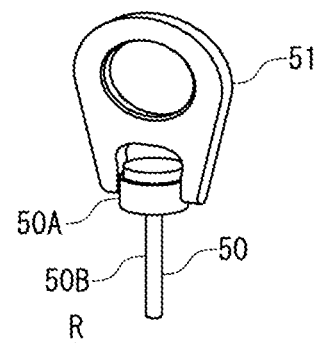
FIG. 3B is a view showing a maintenance fastener with a pulling eye, on which a wire W can be mounted, mounted on it.

In order to mount the wire W on the windshield 12, a suspension fastener 50 having a pulling eye 51, on which the wire W can be fitted, in its head part 50A is fixed on the windshield 12 as shown in FIG. 3B. The recess R (FIG. 3C), into which a tool can be inserted from the outside of the aircraft, is formed in the head part 50A of the suspension fastener 50. The material, the diameter, etc. of the suspension fastener 50 are properly determined so that the suspension fastener 50 has a sufficient strength against a load acting on it while the windshield 12 is suspended. The same number of suspension fasteners 50 as the number of the wires W to be mounted on the windshield 12 is required.

Figure 3C:
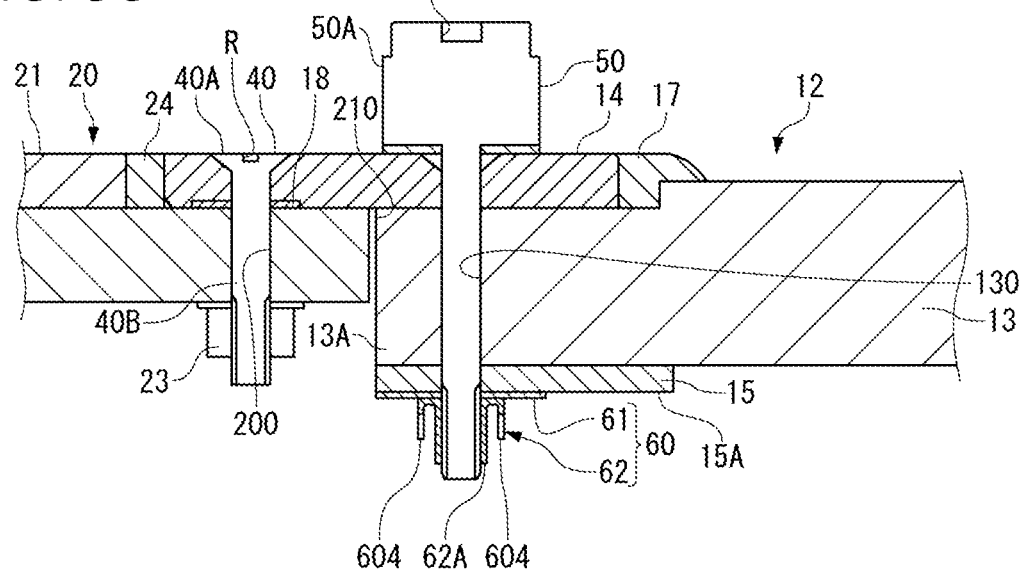
FIG. 3C is a view showing a state in which the windshield fastener (first fastener) shown in FIG. 4A is replaced with a suspension fastener.

Dedicated holes and bushes for fixing each of the suspension fasteners 50 are not provided in the windshield 12. All the suspension fasteners 50 are inserted into the through-holes 130 in place of the windshield fasteners 30 as shown in FIG. 3C. Then, the suspension fasteners 50 are fixed on a plate nut device 60 provided in the inboard retainer 15.

Figure 4A:
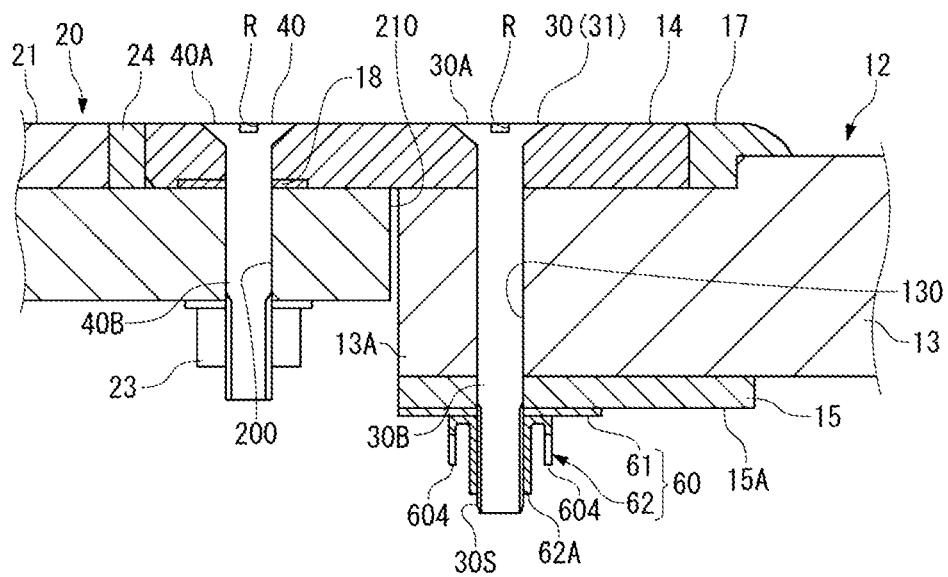
FIG. 4A is a view along the line IVa-IVa of FIG. 5B.
Figure 4B:
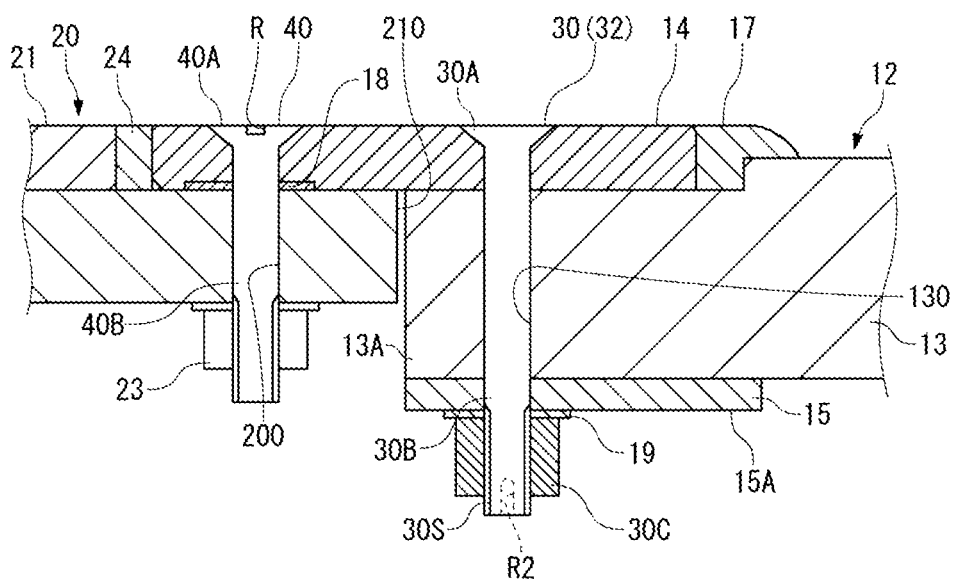
FIG. 4B is a view along the line IVb-IVb of FIG. 5B.

The windshield fasteners 30 having the head part 30A in which the recess R, into which a tool can be inserted, is formed as shown in FIG. 4A is used as the windshield fasteners 30 to be replaced with the suspension fasteners 50 so that the windshield fasteners 30 can be attached or detached from the outside of the aircraft. FIG. 4B shows the windshield fastener 30 which cannot be attached or detached from the outside of the aircraft, and this windshield fastener 30 has no recess R in the head part 30A (same as the windshield fastener 30 of FIG. 2).

Hereinafter, the windshield fastener 30 having the recess R and attachable and detachable from the outside of the aircraft (FIG. 4A) will be called a first fastener 31, while the windshield fasteners 30 which cannot be attached or detached from the outside of the aircraft (FIG. 4B) will be called a second fastener 32.

In case it is necessary to remove the second fastener 32, a recess R2 (indicated by the dashed line in FIG. 4B), into which a tool can be inserted, is formed, for example, at the leading end of the shank part 30B of the second fastener 32, while no recess R for inserting the tool is formed in the head part 30A of the second fastener 32. Therefore, the second fastener 32 cannot be removed at least from the outside of the aircraft.

The first fastener 31 (FIG. 4A) has the recess R formed in the head part 30A, and a fastening bolt equal to or higher than the second fastener 32 in material strength, shearing strength, tensile strength, etc. can be used as the first fastener 31.

At the time when the first fastener 31 is removed from the windshield 12 by inserting a tool into the recess R and the suspension fastener 50 is fixed on the windshield 12 in place of the first fastener 31, the airframe fixing fastener 40 is not yet removed and the windshield 12 is fixed on the airframe 20. The back side of the windshield 12 is covered with the interior members inside the cockpit, and unless the interior members are removed or partially destroyed, the nut 30C cannot be pressed with a tool by exposing the back side of the windshield 12.

In this embodiment, to fasten the first fasteners 31 simply by working from the outside of the aircraft, the plate nut device 60 is provided on the inboard retainer 15. The plate nut device 60 is disposed in the space between the inboard retainer 15 and the interior members.

This plate nut device 60 is used for fixing the first fastener 31 as well as for fixing the suspension fastener 50.

Figure 5A:
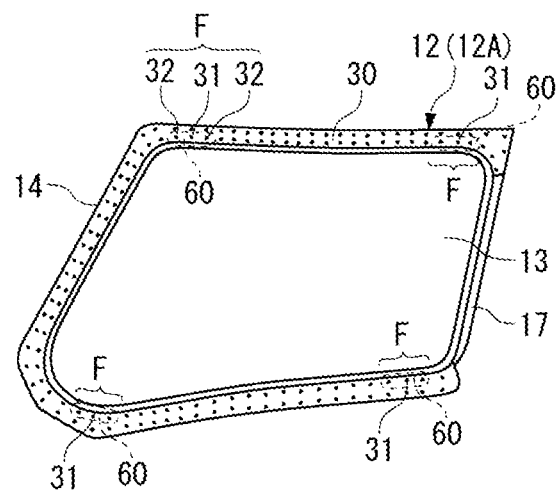
FIG. 5A is a view showing the windshield from the outside of the aircraft.

As shown in FIG. 5A, the plate nut device 60 is provided in the peripheral edge part of the windshield 12 at a plurality of positions (four positions in this example) at a distance from one another in the circumferential direction. The positions of the plate nut devices 60 correspond to the positions of the first fasteners 31. It is preferable to select the positions of the first fasteners 31 such that the windshield 12 can be stably suspended.

The first fastener 31 constitutes a fastener group F along with the pair of second fasteners 32, 32 which is disposed one on each side of the first fastener 31 in alignment with the row formed by the windshield fasteners 30 along the peripheral edge part of the windshield panel 13.

Figure 5B:
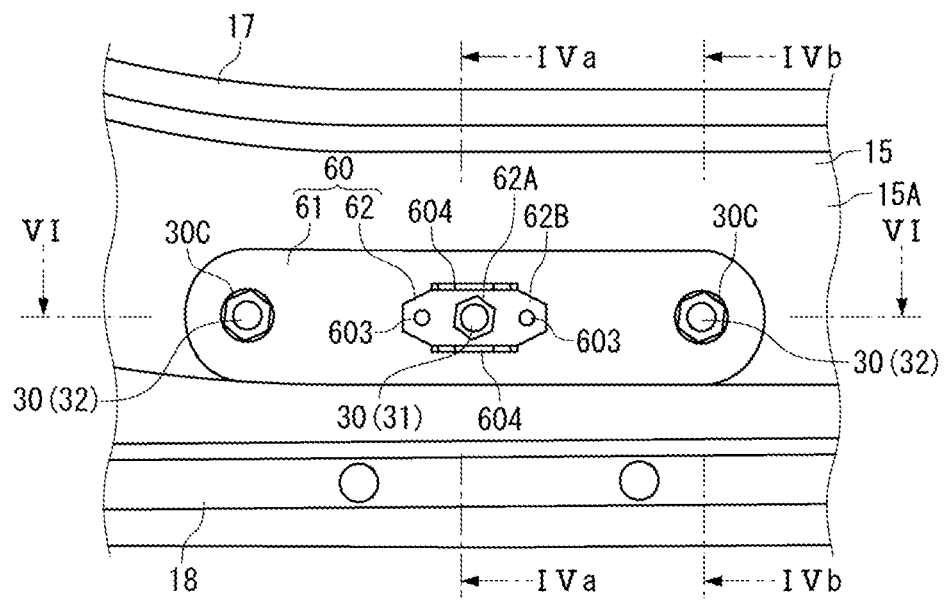
FIG. 5B is an enlarged view showing a plate nut device disposed on the windshield on the inside of the aircraft.
Figure 6:
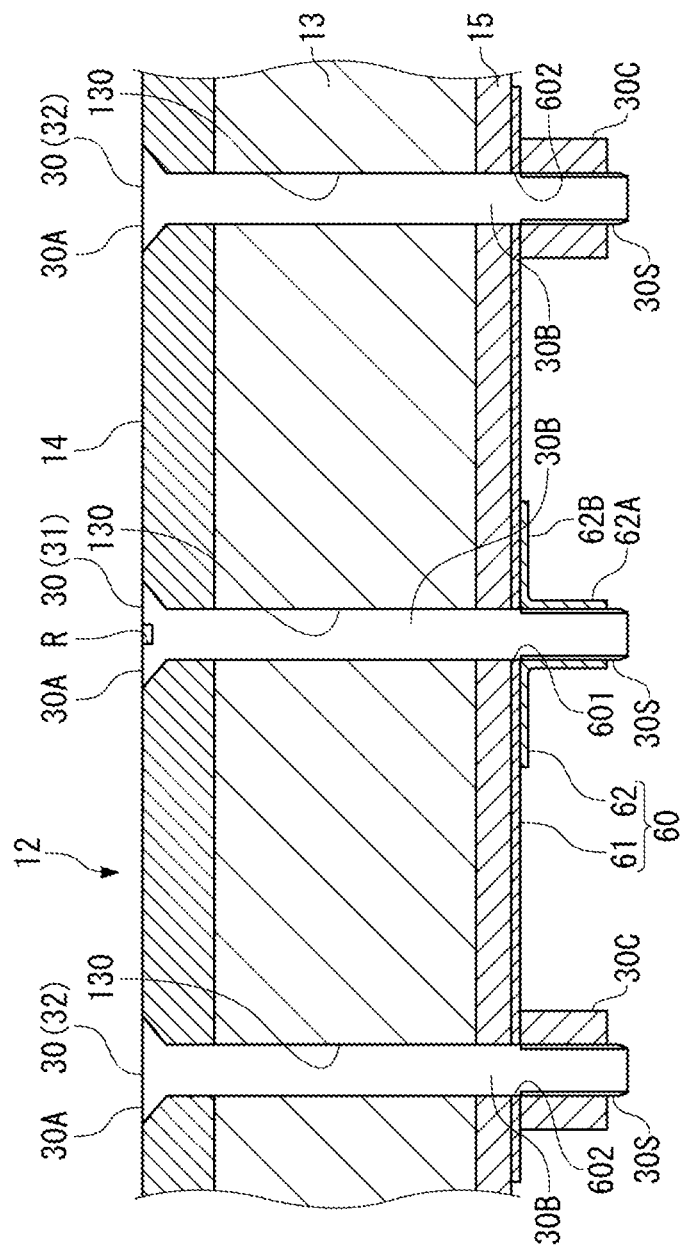
FIG. 6 is a view along the line VI-VI of FIG. 5B showing the first fastener located at the center of the plate nut device and second fasteners located at both ends of the plate nut device.
Figure 7:
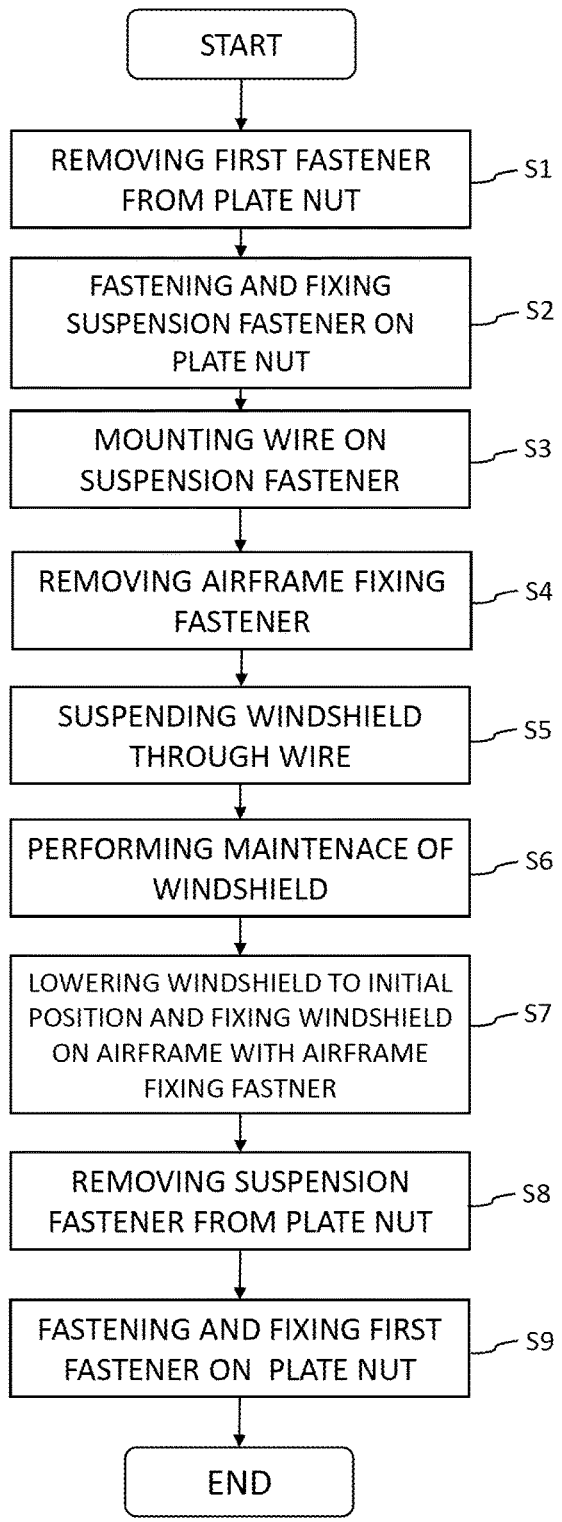
FIG. 7 is a view showing the maintenance procedure of the windshield.

As shown in FIG. 5B and FIG. 6, each plate nut device 60 includes a support plate 61 disposed on a surface 15A of the inboard retainer 15 on the inside of the aircraft and a plate nut 62 fixed in a central part of the surface of a support plate 61 on the inside of the aircraft.

The support plate 61 extends over a region including one fastener group F.

On both sides of the support plate 61 in the length direction, a second through-hole 602 through which the second fastener 32 is passed is formed as shown in FIG. 6. At the center of the support plate 61 located between these second through-holes 602, 602, a first through-hole 601 through which the first fastener 31 is passed is formed.

The support plate 61 is fastened along with the windshield panel 13 by the first fastener 31 and the pair of second fasteners 32, 32.

The plate nut 62 includes a fixing nut 62A and a plate 62B through which the fixing nut 62A is fixed on the support plate 61. The plate 62B is fixed on the support plate 61 at two positions through rivets 603 (FIG. 5B). In the plate 62B, a pair of reinforcing ribs 604, 604 rising from the end edge of the plate 62B is formed along the length direction of the support plate 61.

It is preferable that the plate nut 62 be formed from a metal material having a high specific strength such as stainless steel or a titanium alloy. In contrast, it is preferable that the support plate 61 be formed from a lightweight aluminum alloy etc.

The fixing nut 62A forms a hole which communicates with the first through-hole 601 of the support plate 61.

When assembling the windshield 12, for the first fasteners 31 and the second fasteners 32, 32 constituting the fastener group F, the support plate 61 of the plate nut device 60 is interposed between the inboard retainer 15 and the nut 30C. Then, by fastening the second fastener 32 to the nut 30C, the windshield 12 is assembled and at the same time the plate nut device 60 is fixed on the windshield 12.

The first fastener 31 can be fastened to the fixing nut 62A of the plate nut device 60 from the outside of the aircraft using a tool which is inserted into the recess R. The support plate 61 is fixed on the inboard retainer 15 at two points at which the second fasteners 32, 32 are located, and the plate nut 62 is also fixed on the support plate 61 at two points through the rivets 603, 603, so that rotation of the plate nut 62 relative to the windshield 12 is restricted. Therefore, the first fastener 31 is fastened to the fixing nut 62A even when the fixing nut 62A is not pressed with a tool from the inside of the aircraft so as not to rotate when fastening the first fastener 31 to the fixing nut 62A.

Since the sufficient rigidity of the plate nut 62 against the load acting on it during fastening of the first fastener 31 is secured by the reinforcing ribs 604, 604 of the plate nut 62, the first fastener 31 can be securely fastened to a specified torque.

Next, the maintenance procedure of the windshield 12 will be briefly described with reference to FIGS. 3A, 3B, 3C and FIG. 7.

In order to prevent fall of the windshield 12 during maintenance, it is necessary to mount the wires W on the windshield 12 as shown in FIG. 3A before removing the windshield 12 from the airframe so that the windshield 12 can be suspended.

For this purpose, first, the first fasteners 31 are loosened from the fixing nuts 62A of the plate nut devices 60 to remove the first fasteners 31 (step S1).

Here, since the head part 30A of the second fasteners 32 has no recess while the head part 30A of the first fasteners 31 has the recess R, it is possible to easily sort out the first fasteners 31 from the row of the large number of windshield fasteners 30 on the basis of the presence or the absence of the recess R, and to loosen the first fasteners 31 from the plate nuts 62 by inserting a tool into the recess R to remove the first fasteners 31. It is also possible to avoid mistakenly removing the second fasteners 32, which have no recess R, from the windshield 12.

Next, the suspension fasteners 50 are inserted into the same through-holes 130 into which the removed first fasteners 31 have been inserted into, and the suspension fasteners 50 are fastened and fixed to the fixing nuts 62A of the plate nuts 62 (step S2).

Subsequently, the pulling eyes 51 (FIG. 3B) are mounted on the head parts 50A of the suspension fasteners 50, and the wires W are mounted on the pulling eyes 51 and a hook (not shown) of the crane (step S3).

Thus, now that the windshield 12 is ready to be suspended, all the airframe fixing fasteners 40 which fix the windshield 12 on the airframe 20 are removed (step S4). Meanwhile, the border retainer 16 is also removed from the windshield 12.

Then, the windshield 12 is lifted from the airframe 20 by steering the arm of the crane, and the windshield 12 is suspended through the wires W (step S5). In the same position, or after the windshield 12 is lowered onto a maintenance stand, maintenance of the windshield 12 is performed (step S6).

When maintenance of the windshield 12 is completed, the windshield 12 is lowered to the initial position by the crane, and the windshield 12 is fixed on the airframe 20 with the airframe fixing fasteners 40 (step S7).

Further, the wires W and the pulling eyes 51 are removed from the suspension fasteners 50, and the suspension fasteners 50 are loosened from the fixing nuts 62A of the plate nut devices 60 and removed from the windshield 12 (step S8).

Finally, the first fasteners 31 are inserted into the through-holes 130 into which the suspension fasteners 50 have been inserted, and the first fasteners 31 are fastened and fixed to the fixing nuts 62A (step S9). This completes the series of operations related to maintenance of the windshield 12.

Since all this series of operations can be performed from the outside of the aircraft, there is no need to place personnel inside the cockpit. Of course, there is no need to remove or partially destroy the interior members either.

According to the embodiment having been described above, the suspension fastener 50 can be fixed on the windshield 12 by disposing the support plate 61, on which the fixing nut 62A is fixed, on the inboard retainer 15 on the inside of the aircraft, fastening the support plate 61 along with the windshield 12 by the first fastener 31, which can be replaced with the suspension fastener 50, and the pair of second fasteners 32, 32, and fixing the suspension fastener 50 in place of the first fastener 31 to the fixing nut 62A. This embodiment provides a simpler structure for suspending the windshield 12 without the need for providing the windshield 12 with embedded bushes.

Moreover, according to the present invention, compared with the configuration in which the first fastener 31 and the suspension fastener 50 are fastened to bushes embedded and bonded in the windshield panel 13, the maintainability in the case where the fastener is damaged can be improved.

If the first fastener 31 or the suspension fastener 50 fixed on the bush is damaged, since these fasteners cannot be easily removed from the windshield 12, maintenance of the windshield 12 is disrupted. It is difficult to forcibly remove the fasteners and the bushes from the windshield 12 so as to avoid damage to the members provided near the bush. Therefore, it is sometimes necessary to replace the windshield panel 13 with a new one.

In this embodiment, by contrast, even if the first fastener 31 or the suspension fastener 50 is damaged, there is no need to replace the windshield panel 13 but only the first fastener 31 or the suspension fastener 50 needs to be replaced.

Even if the support plate 61 or the plate nut 62 of the plate nut device 60 is damaged, the plate nut device 60 can be replaced with a new one.

According to this embodiment, since the through-hole 130 is shared by the windshield fastener 30, which integrally assembles the components of the windshield 12, and the suspension fastener 50, it is not necessary to provide a dedicated hole, into which the suspension fastener 50 is inserted, in the windshield 12. If a dedicated hole is to be provided, in order to guarantee the strength and rigidity of the windshield 12, it is necessary to determine the suspension positions of the windshield 12 in an early stage of development of an aircraft, and to design the windshield 12 in consideration of various factors including the positions of the through-holes 130 into which the windshield fasteners 30 are inserted, the specifications of the windshield fastener 30, the specifications of the outboard retainer 14, the windshield panel 13, and the inboard retainer 15, and the specifications of the airframe fixing fastener 40.

In this embodiment, the suspension fastener 50 can be fixed on the windshield 12, without requiring any processing on the windshield panel 13, by determining several pieces of the windshield fasteners 30 to serve as the first fasteners 31 to be replaced with the suspension fasteners 50 in an arbitrary stage of development, and providing the plate nut device 60, on which the first fastener 31 is fixed, on the inboard retainer 15 on the inside of the aircraft.

Since a fastener having a strength equal to or higher than that of the second fastener 32 is used as the first fastener 31, no additional strength test is required. It is easy to increase the number of suspension positions of the windshield 12, for example, from three to four positions.

In addition, it is possible to make a selection of the configurations presented in the above-described embodiment or appropriately change the configurations into other configurations within the scope of the present invention.

While in the above-described embodiment the plate nut 62, which has the fixing nut 62A to which the first fastener 31 and the suspension fastener 50 are fixed, and the support plate 61 are fixed with the rivets 603, the fixing nut 62A can be integrally formed in the support plate 61.

The configuration which allows the first fastener 31 and the suspension fastener 50 to be attached or detached from the outside of the aircraft is not limited to the recess formed in the top surface of the head part. In another configuration, for example, the outer periphery of the head part may be formed into a polygonal shape, with which a tool can engage, so that the fasteners can be attached or detached from the outside of the aircraft.

What is claimed is:

1. An aircraft windshield provided in an airframe of an aircraft, the windshield comprising:
    a panel forming the windshield;
    an outboard retainer disposed on the panel on the outside of the aircraft;
    an inboard retainer disposed on the panel on the inside of the aircraft;
    a plurality of windshield fasteners which fasten the outboard retainer, the panel, and the inboard retainer; and
    a plurality of airframe fixing fasteners which fasten the outboard retainer and the airframe, wherein
    a row formed by the plurality of windshield fasteners along a peripheral edge part of the panel, includes a plurality of fastener groups, wherein each fastener group includes a first fastener disposed at a predetermined position and a pair of second fasteners disposed in alignment with the row, one on each side of the first fastener, and wherein each fastener group is disposed at intervals along a circumference of the panel,
    a plate corresponding to each fastener group, wherein the plate is fastened to the panel by the first fastener and the pair of second fasteners of the corresponding fastener group, is disposed on the inboard retainer on the inside of the aircraft, the plate comprises a fixing nut that is fixed at the center of the plate and a primary through-hole coincident with the fixing nut and a pair of secondary through-holes wherein each secondary through-hole is positioned at an opposite side of the fixing nut and wherein the pair of second fasteners is inserted into the pair of secondary through-holes,
    the first fastener is attached to the fixing nut from the outside of the aircraft,
    at least one second fastener of the pair of second fasteners of each fastener group is fastened to a removable nut, wherein the removable nut is not fixed with respect to the plate, and
    the first fastener in each fastener group is configured to be detached from the fixing nut and can be replaced with a suspension fastener on which a lifting component to be mounted on the windshield can be fitted.

2. The aircraft windshield according to claim 1, wherein each windshield fastener of the plurality of windshield fasteners comprises a head part, and each windshield fastener is disposed with its head part directed to the outside of the aircraft,
    a recess, into which a tool can be inserted, is provided in the head part of the first fastener, and the recess is not provided in the head part of the second fastener.

3. An aircraft comprising the aircraft windshield according to claim 1.

4. An aircraft comprising the aircraft windshield according to claim 2.

5. A method for suspending the aircraft windshield according to claim 1 with a lifting component, including:
   loosening the first fastener of each fastener group from the corresponding fixing nut from the outside of the aircraft;
   removing the first fastener of each fastener group from the corresponding primary through-hole of the windshield;
   inserting one of the suspension fasteners into the corresponding primary through-hole of the windshield from the outside of the aircraft and fastening the one suspension fastener to the corresponding fixing nut;
   removing the airframe fixing fasteners from the outside of the aircraft; and
   suspending the windshield with the lifting component.

6. A method for suspending the aircraft windshield according to claim 2 with a lifting component, including:
   loosening the first fastener of each fastener group from the corresponding fixing nut from the outside of the aircraft;
   removing the first fastener of each fastener group from the corresponding primary through-hole of the windshield;
   inserting one of the suspension fasteners into the corresponding primary through-hole of the windshield from the outside of the aircraft and fastening the one suspension fastener to the corresponding fixing nut;
   removing the airframe fixing fasteners from the outside of the aircraft; and
   suspending the windshield with the lifting component.

\* \* \* \* \*